(12) United States Patent
Ruggeri

(10) Patent No.: US 11,563,377 B2
(45) Date of Patent: Jan. 24, 2023

(54) HYBRID POWER CONVERTERS

(71) Applicant: Dialog Semiconductor (UK) Limited, London (GB)

(72) Inventor: Marco Ruggeri, Haar (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/239,985

(22) Filed: Apr. 26, 2021

(65) Prior Publication Data
US 2022/0345042 A1 Oct. 27, 2022

(51) Int. Cl.
*H02M 3/158* (2006.01)
*H02M 1/00* (2006.01)

(52) U.S. Cl.
CPC ....... *H02M 3/1582* (2013.01); *H02M 1/0095* (2021.05)

(58) Field of Classification Search
CPC .. H02M 3/1582; H02M 3/1584; H02M 3/155; H02M 3/156; H02M 1/0095
See application file for complete search history.

(56) References Cited

U.S. PATENT DOCUMENTS

| | | | |
|---|---|---|---|
| 10,027,223 B1 | 7/2018 | Zhang et al. | |
| 10,476,390 B2* | 11/2019 | Petersen | H02M 3/1582 |
| 2005/0047180 A1 | 3/2005 | Kim | |
| 2018/0175726 A1* | 6/2018 | Petersen | H02M 3/156 |
| 2020/0212801 A1* | 7/2020 | Cavallini | H02M 3/158 |

FOREIGN PATENT DOCUMENTS

| | | |
|---|---|---|
| DE | 693 19 512 T2 | 7/1998 |
| EP | 0 585 925 81 | 7/1998 |

OTHER PUBLICATIONS

German Office Action, File No. 10 2021 207 159.7, Applicant: Dialog Semiconductor (UK) Limiter, dated Dec. 7, 2021, 6 pages.
"Designing an Inverting Buck Boost Using the ADP2300 and ADP2301 Switching Regulators," by Matthew C. Kessler, © 2010 Analog Devices, Inc., AN-1083 Application Note, pp. 1-8.
"What is a low noise inverting buck converter?," by Chris Glaser, Oct. 30, 2017, pp. 1-3, Power management—Technical articles—TI E2E support forums, Found: https//e2e.ti.com/blogs_/b/powerhouse/posts/what-is-a-low-noise-inverting-buck-converter.

* cited by examiner

*Primary Examiner* — Nguyen Tran
(74) *Attorney, Agent, or Firm* — Saile Ackerman LLC; Stephen B. Ackerman

(57) ABSTRACT

Hybrid power converters are presented. The power converters can receive an input voltage at an input node and generate an output voltage at an output node. The power converters can have an inductor coupled between an inductor node and the output node. The power converters can have a first flying capacitor coupled between a first capacitor node and a second capacitor node. The power converters can have a second flying capacitor coupled between a third capacitor node and the inductor node. A first switching element may be coupled between the input node and the first capacitor node, and a fifth switching element may be coupled between the first capacitor node and the third capacitor node. Additionally, a sixth switching element may be coupled between the second capacitor node and the inductor node.

26 Claims, 19 Drawing Sheets

| Switch | $V_{DS\_max}$ |
|---|---|
| S1 | $V_{IN}$ |
| S2 | $V_{IN}$ |
| S3 | $V_{IN}$ |

| Switch | $V_{DS\_max}$ |
|--------|---------------|
| S1 | $V_{IN}$ |
| S2 | $V_{IN}$ |
| S3 | $V_{IN}$ |
| S4 | $V_{IN}$ |
| S5 | $2V_{IN}$ |
| S6 | $2V_{IN}$ |

*FIG. 6*

| \multicolumn{4}{c}{$V_{DS\_max}$} |||
| Switch | New Hybrid | Varient LV S5 | Varient LV S6 |
|---|---|---|---|
| S1 | $V_{IN}$ | $V_{IN}$ | $V_{IN}$ |
| S2 | | | |
| S3 | | | |
| S4 | | | |
| S5 | | | $2V_{IN}$ |
| S6 | | $2V_{IN}$ | $V_{IN}$ |

FIG. 23

HYBRID POWER CONVERTERS

TECHNICAL FIELD

The present document relates to power converters. In particular, the present document relates to improved hybrid buck-boost power converters for generating negative output voltages which may be implemented using transistors with low voltage ratings (i.e. with low maximum drain-source voltages).

BACKGROUND

There is an increasing demand for high-efficiency, regulated power converters in several market segments such as e.g. solid-state drives (SSDs), computing devices, charging devices, wearable power management integrated circuits (PMICs) and display power supply integrated circuits. Specifically, it is highly desirable to design power converters with higher efficiency and smaller area.

The present document concerns "hybrid" buck-boost power converters, i.e. power converters comprising both flying capacitors and inductors. Buck-boost power converters typically comprise a plurality of the switching elements for controlling current paths within the power converter. Depending on the application scenario, the regulated output voltage may be higher than, lower than, or equal to the input voltage of the power converter. To this end, the switching behavior of the switching elements is adapted such that the power converter operates in buck mode, in boost mode, or in buck-boost mode.

SUMMARY

Each switching element is characterized by a voltage rating, i.e. a maximum voltage the switching element can withstand without being damaged. If field effect transistors (FETs) are used as switching elements, the voltage rating may correspond to the maximum voltage that may be applied across the non-conducting drain-source channel of a FET. Put in a different way, when the FET is turned off, the voltage rating may be seen as the maximum voltage that may be applied across the drain-source channel of the transistor which results in no current flow across the drain-source channel, or a current flow which is below a predefined threshold current. Using FETs with reduced voltage rating makes it possible to reduce the area of the switching elements for a given target resistance Ron since FETs with lower voltage rating typically have a smaller specific resistance and a smaller gate capacitance. It is therefore desirable to design a new hybrid power converter which allows the usage of FETs with low voltage ratings.

The present document addresses the above-mentioned technical problems. In particular, the present document addresses the technical problem of providing novel hybrid buck-boost power converters which may be implemented with FETs with a reduced voltage rating and/or size.

According to an aspect, a power converter is presented. The power converter may be configured to receive an input voltage at an input node of the power converter and to generate an output voltage at an output node of the power converter. In particular, the power converter may be configured to generate a negative output voltage at said output node. In other words, the power converter may be configured to generate an output voltage having opposite polarity with respect to the input voltage. The power converter may comprise an inductor coupled between an inductor node and the output node. The power converter may comprise a first flying capacitor coupled between a first capacitor node and a second capacitor node. The power converter may comprise a second flying capacitor coupled between a third capacitor node and the inductor node. The power converter may comprise a first switching element coupled between the input node and the first capacitor node. The power converter may comprise a fifth switching element coupled between the first capacitor node and the third capacitor node.

Instead of coupling the fifth switching element between the input node and the third capacitor node, the fifth switching element may be indirectly coupled to the input node via the first switching element. In other words, the fifth switching element may be coupled in series with the first switching element between the input node and the third capacitor node. In yet other words, the fifth switching element may be coupled in parallel to the first flying capacitor. On the one hand, when the fifth switching element is turned on, an input current may be provided to the fifth switching element via the first switching element. On the other hand, when the fifth switching element is turned off, the maximum voltage across the fifth switching element may be reduced since the fifth switching element may not be drawn to the input voltage but only to the voltage at the first capacitor node. The voltage at the first capacitor node may be in turn drawn to the reference potential when the fifth switching element is turned off, thereby reducing the required voltage rating for the fifth switching element.

The flying capacitors may be passive electronic components capable of storing electrical energy in an electric field. Each flying capacitor may comprise a first terminal and a second terminal. The flying capacitors are denoted as "flying" since, during different operation modes of the described power converter, one of said terminals may be a fixed terminal which is driven to a defined voltage level and the voltage at the other terminal may fly to a voltage that depends on the voltage at the fixed terminal and the voltage across the flying capacitor. The voltage across the flying capacitor may in turn depend on the amount of charge stored and on the capacitance of the flying capacitor. The terminals of the flying capacitors may not be permanently connected to the input voltage or to a reference potential (such as e.g. ground).

Throughout this document, the term "reference potential" is meant in its broadest possible sense. In particular, the reference potential is not limited to ground i.e. a reference potential with a direct physical connection to earth or a voltage of 0V. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

The switching elements described within this document may be implemented with any suitable devices, such as, for example, metal-oxide-semiconductor field effect transistors (MOSFETs), insulated-gate bipolar transistors (IGBTs), MOS-gated thyristors, or other suitable power devices. The switching elements may be implemented using identical transistors or different transistors. For example, some switching elements may be p-type MOSFETs and other switching elements may be implemented using n-type MOSFETs. Each switching element may have a control terminal (e.g. a gate) to which a respective control signal or driving voltage may be applied to turn the switching element on (i.e. to close the switching element) or to turn the switching element off (i.e. to open the switching element).

In general, the power converter may be configured to operate in one of at least three different operation modes: a buck operation mode, a boost operation mode, or a buck-boost operation mode. Depending on the selected operation mode, the power converter may be configured to switch between a first, a second, and a third phase of operation as will be described in greater detail below. As already mentioned, the output voltage of the power converter may be negative. In the buck operation mode, the absolute value of the regulated output voltage may be lower than the absolute value of the input voltage, and the output current may be higher than the input current. In the boost operation mode, the absolute value of the regulated output voltage may be higher than the absolute value of the input voltage, and the output current may be lower than the input current. Finally, in the buck-boost operation mode, the absolute value of the regulated output voltage may be higher or lower than the absolute value of the input voltage. The absolute value of the regulated output voltage may also be equal to the absolute value of the input voltage.

The power converter may be configured to charge the second flying capacitor by establishing a current path from the input node, via the first switching element, via the fifth switching element, and via the second flying capacitor to a reference potential. Thus, the power converter may be configured to turn the fifth switching element on in order to charge the second flying capacitor.

The power converter may be configured to discharge the first flying capacitor and the second flying capacitor by turning off the fifth switching element and by establishing a current path from a reference potential, via the first flying capacitor, via the second flying capacitor, and via the inductor to the output node of the power converter.

The power converter may further comprise a second switching element coupled between the first capacitor node and a reference potential. The power converter may further comprise a third switching element coupled between the second capacitor node and a reference potential. The power converter may further comprise a fourth switching element coupled between the second capacitor node and the third capacitor node. The power converter may further comprise a sixth switching element coupled between the inductor node and a reference potential. Alternatively, the power converter may further comprise a sixth switching element coupled between the inductor node and the second capacitor node.

The power converter may be configured to establish, during a first phase of operation, a first current path from the input node, via the first switching element, and via the first flying capacitor to a reference potential. In other words, during the first phase of operation, the power converter may be configured to charge the first flying capacitor to the input voltage. The power converter may be configured to establish, during the first phase of operation, a second current path from the input node, via the first switching element, via the fifth switching element, and via the second flying capacitor to the reference potential. In other words, during the first phase of operation, the power converter may be configured to charge the second flying capacitor to the input voltage. The power converter may be configured to establish, during the first phase of operation, a third current path from the reference potential via the inductor to the output node of the power converter.

The power converter may be configured to establish, during a second phase of operation, a first current path from the input node, via the first switching element, and via the first flying capacitor to a reference potential. The power converter may be configured to establish, during the second phase of operation, a second current path from the reference potential, via the second flying capacitor, and via the inductor to the output node of the power converter.

Finally, the power converter may be configured to establish, during a third phase of operation, a current path from a reference potential, via the first flying capacitor, via the second flying capacitor, and via the inductor to the output node of the power converter.

According to another aspect, another power converter is presented. The power converter may be configured to receive an input voltage at an input node of the power converter and to generate an output voltage at an output node of the power converter. The power converter may comprise an inductor coupled between an inductor node and the output node. The power converter may comprise a first flying capacitor coupled between a first capacitor node and a second capacitor node. The power converter may comprise a second flying capacitor coupled between a third capacitor node and the inductor node. The power converter may comprise a first switching element coupled between the input node and the first capacitor node. The power converter may comprise a sixth switching element coupled between the second capacitor node and the inductor node.

Instead of coupling the sixth switching element between a reference potential and the inductor node, the sixth switching element may be indirectly coupled to the reference potential via the second capacitor node. In other words, the sixth switching element may be coupled in parallel to the second flying capacitor, which limits the voltage across said sixth switching element. On the one hand, when the sixth switching element is turned on, a current may flow through the sixth switching element for charging the second flying capacitor. On the other hand, when the sixth switching element is turned off, the maximum voltage across the sixth switching element may be reduced since the sixth switching element may not be drawn to the reference potential but only to the voltage at the second capacitor node. The voltage at the second capacitor node may be drawn to a negative input voltage when the sixth switching element is turned off, wherein the voltage at the inductor node may be as low as twice the negative input voltage. In this way, the required voltage rating for the sixth switching element may be reduced.

The power converter may be configured to charge the second flying capacitor by establishing a current path from the input node, via the second flying capacitor, and via the sixth switching element to a reference potential. Thus, the power converter may be configured to turn the sixth switching element on in order to charge the second flying capacitor.

The power converter may be configured to discharge the first flying capacitor and the second flying capacitor by turning off the sixth switching element and by establishing a current path from a reference potential, via the first flying capacitor, via the second flying capacitor, and via the inductor to the output node of the power converter.

The power converter may further comprise a second switching element coupled between the first capacitor node and a reference potential. The power converter may further comprise a third switching element coupled between the second capacitor node and a reference potential. The power converter may further comprise a fourth switching element coupled between the second capacitor node and the third capacitor node. The power converter may further comprise a fifth switching element coupled between the third capacitor node and the input node of the power converter. Alternatively, the power converter may further comprise a fifth switching element coupled between the third capacitor node and the first capacitor node.

The power converter may be configured to establish, during a first phase of operation, a first current path from the input node, via the first switching element, and via the first flying capacitor to a reference potential. In other words, during the first phase of operation, the power converter may be configured to charge the first flying capacitor to the input voltage. The power converter may be configured to establish, during the first phase of operation, a second current path from the input node, via the second flying capacitor, and via the sixth switching element to the reference potential. In other words, during the first phase of operation, the power converter may be configured to charge the second flying capacitor to the input voltage. The power converter may be configured to establish, during the first phase of operation, a third current path from the reference potential, via the sixth switching element, and via the inductor to the output node of the power converter.

The power converter may be configured to establish, during a second phase of operation, a first current path from the input node via the first flying capacitor to a reference potential. The power converter may be configured to establish, during the second phase of operation, a second current path from the reference potential, via the second flying capacitor, and via the inductor to the output node of the power converter.

The power converter may be configured to establish, during a third phase of operation, a current path from a reference potential, via the first flying capacitor, via the second flying capacitor, and via the inductor to the output node of the power converter.

According to another aspect, a method of operating a power converter is presented. The method may comprise steps which correspond to the functional features of a power converter described in the present document. In particular, the power converter may comprise an inductor coupled between an inductor node and an output node of the power converter, a first flying capacitor coupled between a first capacitor node and a second capacitor node, and a second flying capacitor coupled between a third capacitor node and the inductor node. The method may comprise charging the second flying capacitor by establishing a charging current via a switching element, wherein said switching element is coupled between the first capacitor node and the third capacitor node. The method may comprise discharging the second flying capacitor by establishing a discharging current when said switching element is turned off. The step of establishing the charging current may further comprise establishing the charging current from the input node, via another switching element, via the switching element, and via the second flying capacitor to the reference potential. Further, the step of establishing the discharging current may further comprise establishing the discharging current from a reference potential, via the first flying capacitor, via the second flying capacitor, and via the inductor to the output node of the power converter.

According to another aspect, another method of operating a power converter is presented. Again, the power converter may comprise an inductor coupled between an inductor node and an output node of the power converter, a first flying capacitor coupled between a first capacitor node and a second capacitor node, and a second flying capacitor coupled between a third capacitor node and the inductor node. The method may comprise charging the second flying capacitor by establishing a charging current via a switching element, wherein said switching element is coupled between the second capacitor node and the inductor node. The method may comprise discharging the second flying capacitor by establishing a discharging current when said switching element is turned off. The step of establishing the charging current may further comprise establishing the charging current from the input node, via the second flying capacitor, via the switching element, and via another switching element to the reference potential. The step of establishing the discharging current may further comprise establishing the discharging current from a reference potential, via the first flying capacitor, via the second flying capacitor, and via the inductor to the output node of the power converter.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which

FIG. 6 shows voltage ratings of the FET devices of the converter from FIG. 5;

FIG. 23 shows voltage ratings of the FET devices of the hybrid converter of FIG. 11 and its variants of FIG. 15 and FIG. 16.

DESCRIPTION

Figure 1:
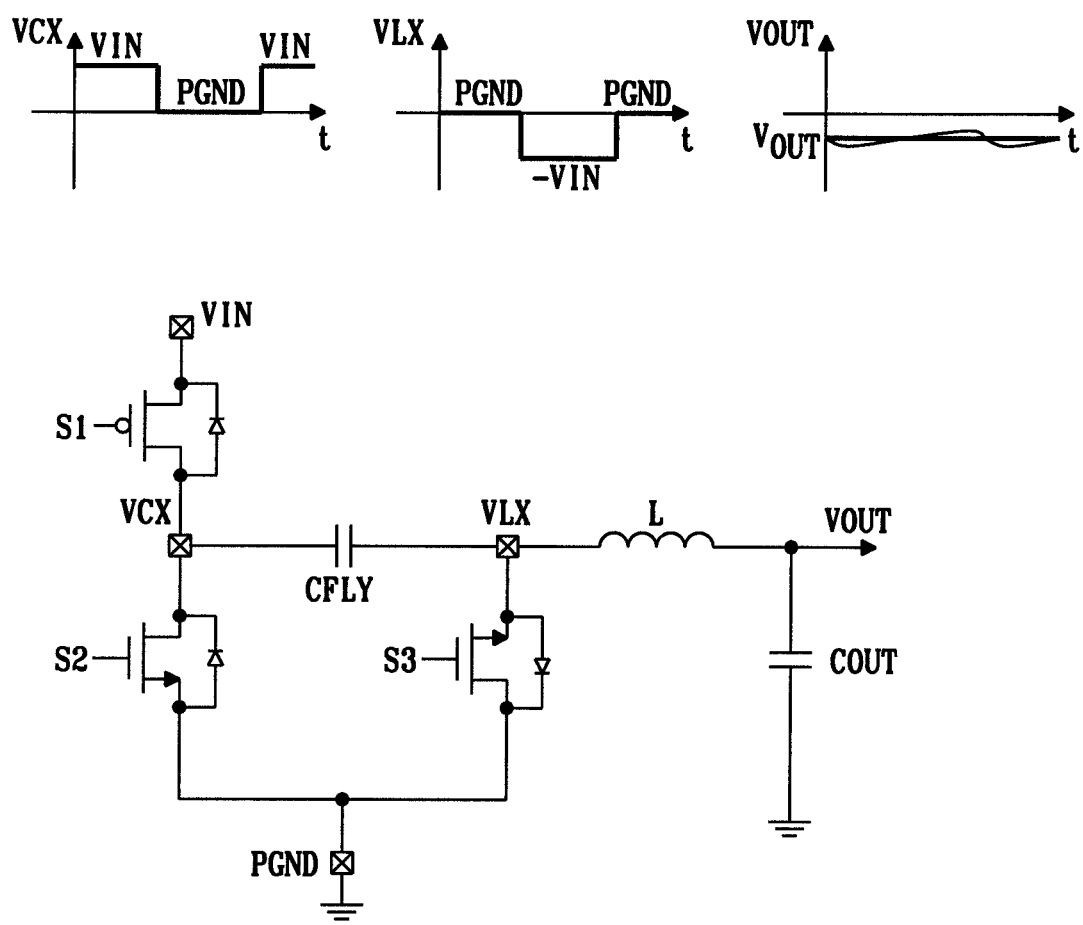
FIG. 1 shows an exemplary inverting buck converter.

The inverting-buck topology shown in FIG. 1 is used to generate a negative output voltage $V_{OUT}$ down to $-V_{IN}$ (theoretically). In mobile applications, the input voltage $V_{IN}$ is typically generated by a single cell Li-Ion battery.

Figure 2:
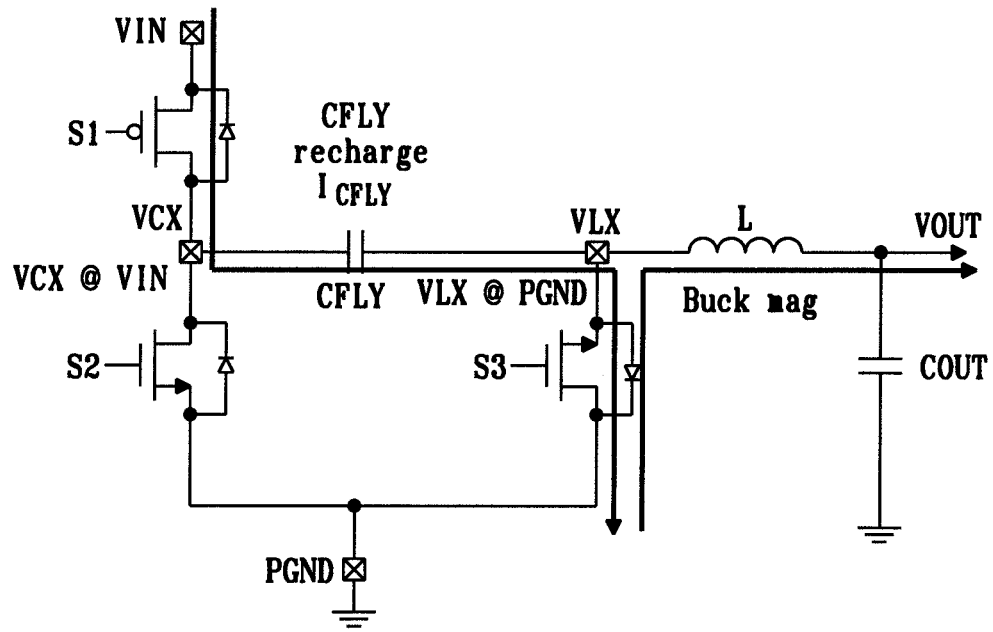
FIG. 2 shows a buck magnetizing phase for the inverting buck converter of FIG. 1.
Figure 3:
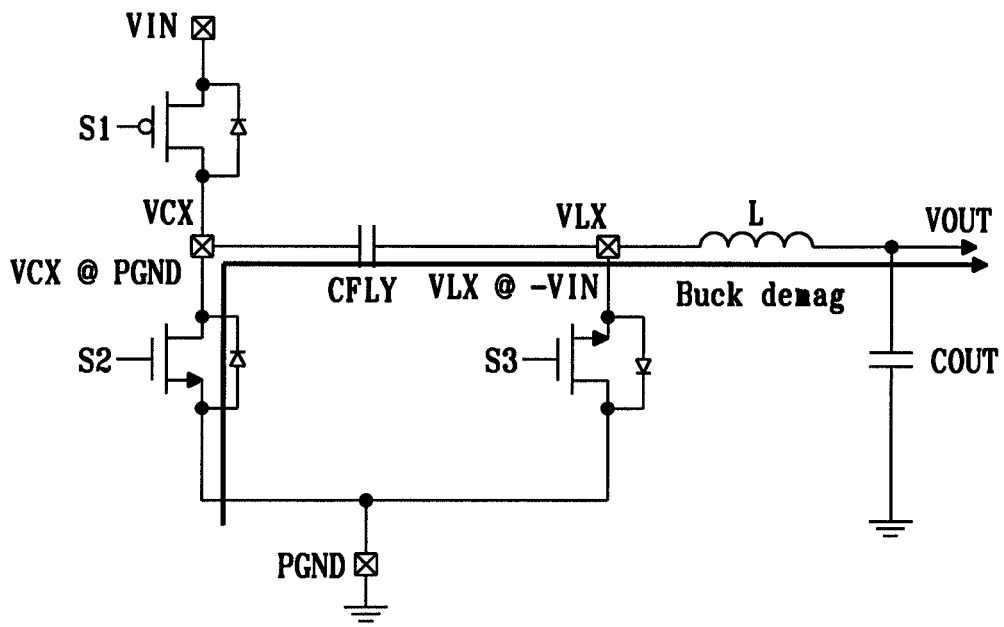
FIG. 3 shows a buck demagnetizing phase for the inverting buck converter of FIG. 1.

FIGS. 2 and 3 show exemplary switching phases of the converter of FIG. 1. The converter cycles through phases of FIG. 2 and FIG. 3 It is equivalent to a conventional buck DC-DC converter: the voltage swing at the LX node is filtered by a second order low pass filter (inductor L and output capacitor $C_{OUT}$) and the output voltage $V_{OUT}$ is taken from the non-grounded terminal of the output capacitor $C_{OUT}$.

The operation of the inverting buck converter consists of:
magnetization phase shown in FIG. 2. The switches S1 and S3 are closed, thus the voltage of nodes VCX and VLX goes to $V_{IN}$ and PGND, respectively. The flying capacitor $C_{FLY}$ is charged to $V_{IN}$ (theoretically), while the inductor is magnetized with $V_{OUT}$/L current slope. The switch S2 is open, thus it experiences a drain-source voltage $V_{DS}=V_{IN}$.

demagnetization phase shown in FIG. 3. The only involved switch is S2: once this FET is turned on, the voltage of node VLX goes below PGND (i.e. to $-V_{IN}$). The flying capacitor $C_{FLY}$ is discharged to the output node, while the inductor is demagnetized with $-(V_{IN}+V_{OUT})$/L current slope. The switches S1, S3 are open, thus they experience a drain-source voltage $V_{DS}=V_{IN}$ in absolute value.

The relationship between $V_{IN}$ and $V_{OUT}$ is expressed by $V_{OUT}/V_{IN}=-(1-D)$, wherein D denotes a duty cycle with $D\in[0,1]$. The voltage rating (i.e. the maximum $V_{DS}$ voltage $V_{DS\_max}$) for the FET devices is summarized in the table illustrated in FIG. 4.

Figures 4, 5:
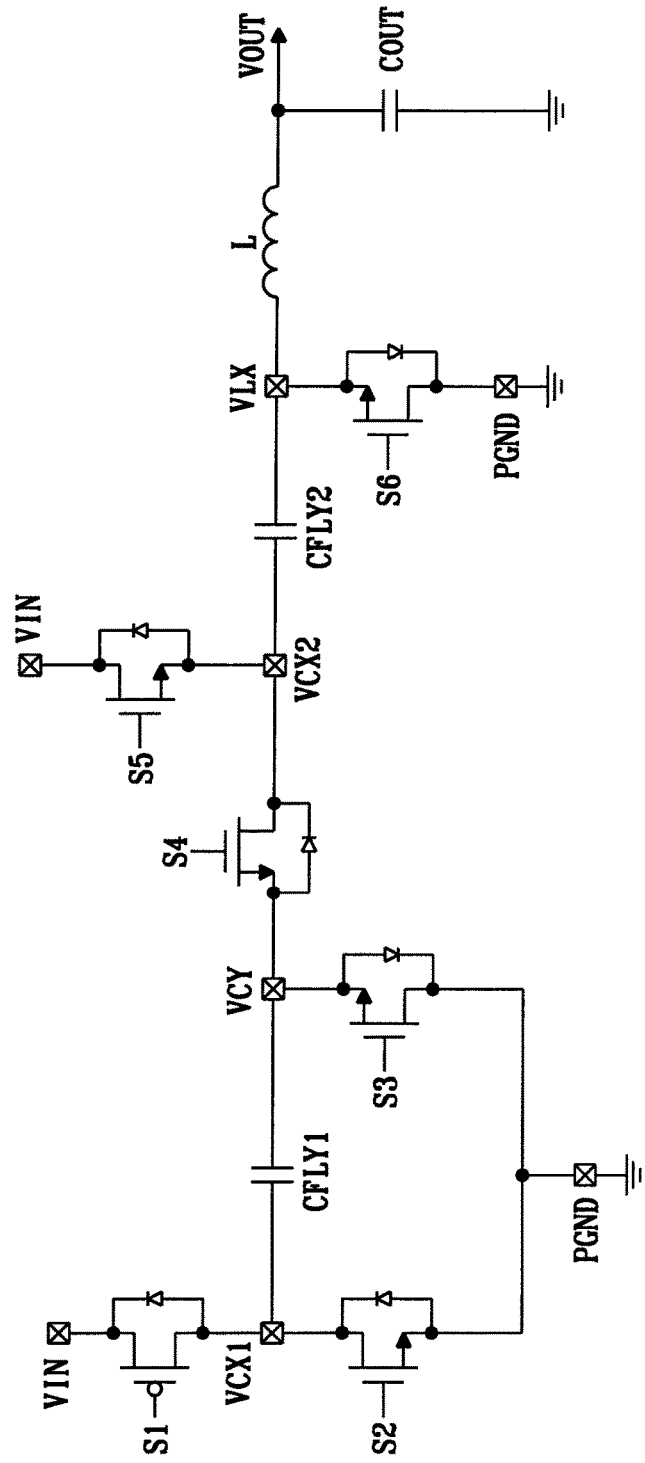
FIG. 4 shows voltage ratings for the FET devices for the inverting buck converter of FIG. 1.
FIG. 5 an exemplary dual-stage converter based on the converter in FIG. 1 enabling $V_{OUT}=-2V_{IN}$ (ideally)

The converting cell shown in FIG. 1 can be replicated in order to achieve a lower output voltage $V_{OUT}$. FIG. 5 shows how a theoretical $V_{OUT}=-2V_{IN}$ can be achieved by putting in series two of the basic cells that create the converter shown in FIG. 1.

Figure 7:
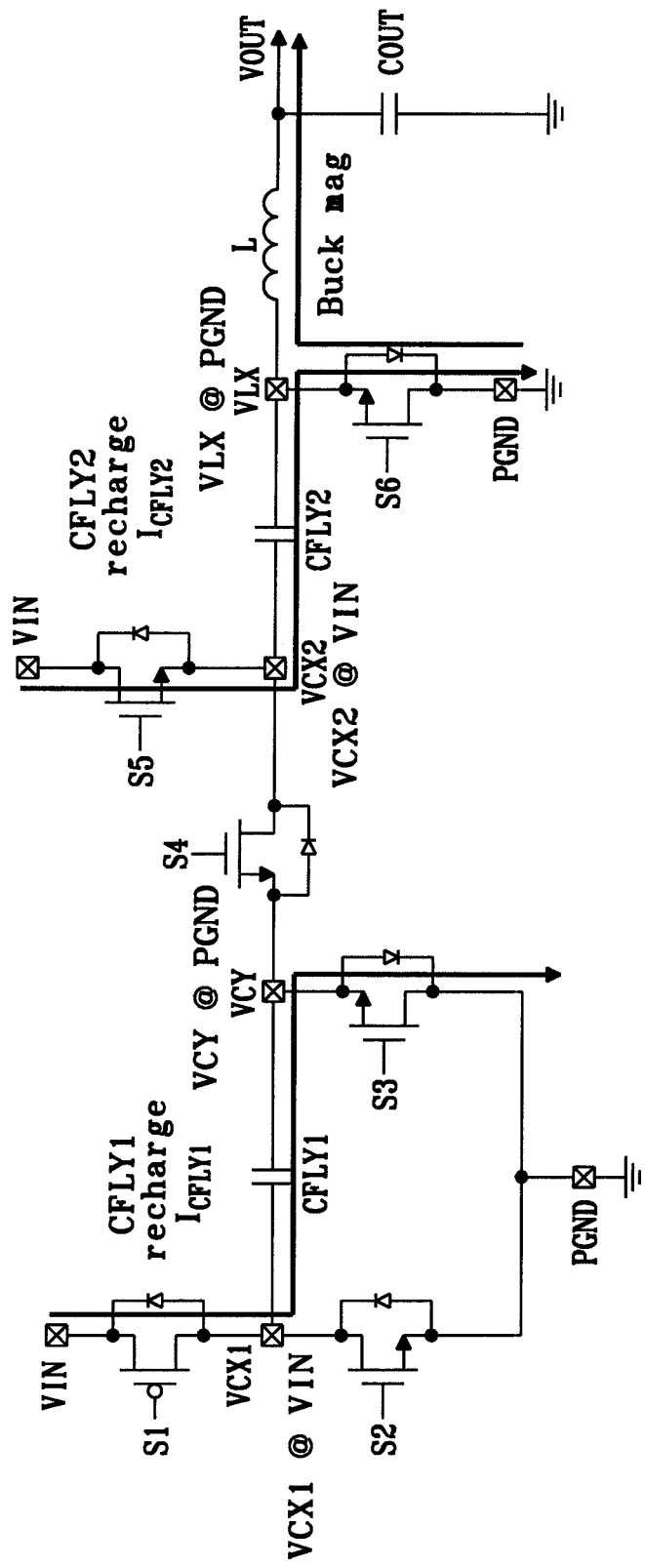
FIG. 7 shows a buck magnetizing phase for the converter of FIG. 5.
Figure 8:
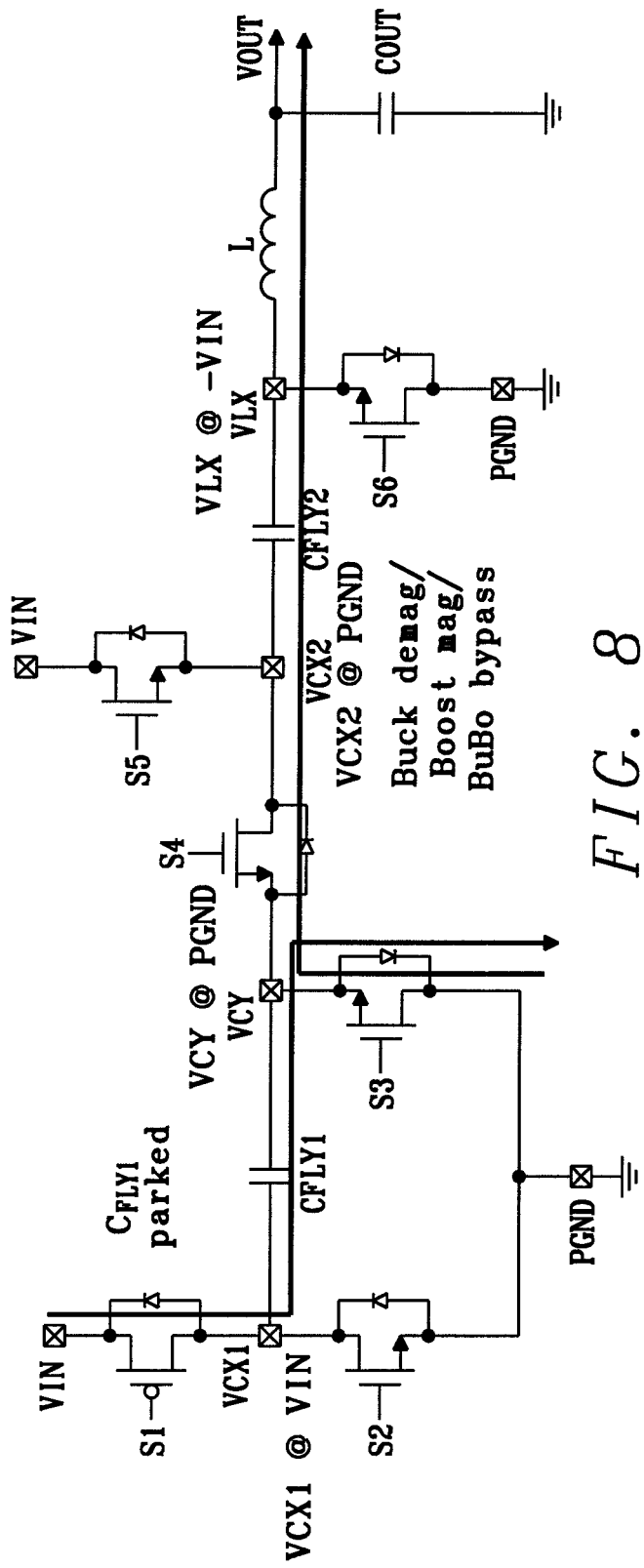
FIG. 8 shows a buck demagnetizing phase/boost magnetizing phase/buck-boost bypass phase for the converter of FIG. 5.
Figure 9:
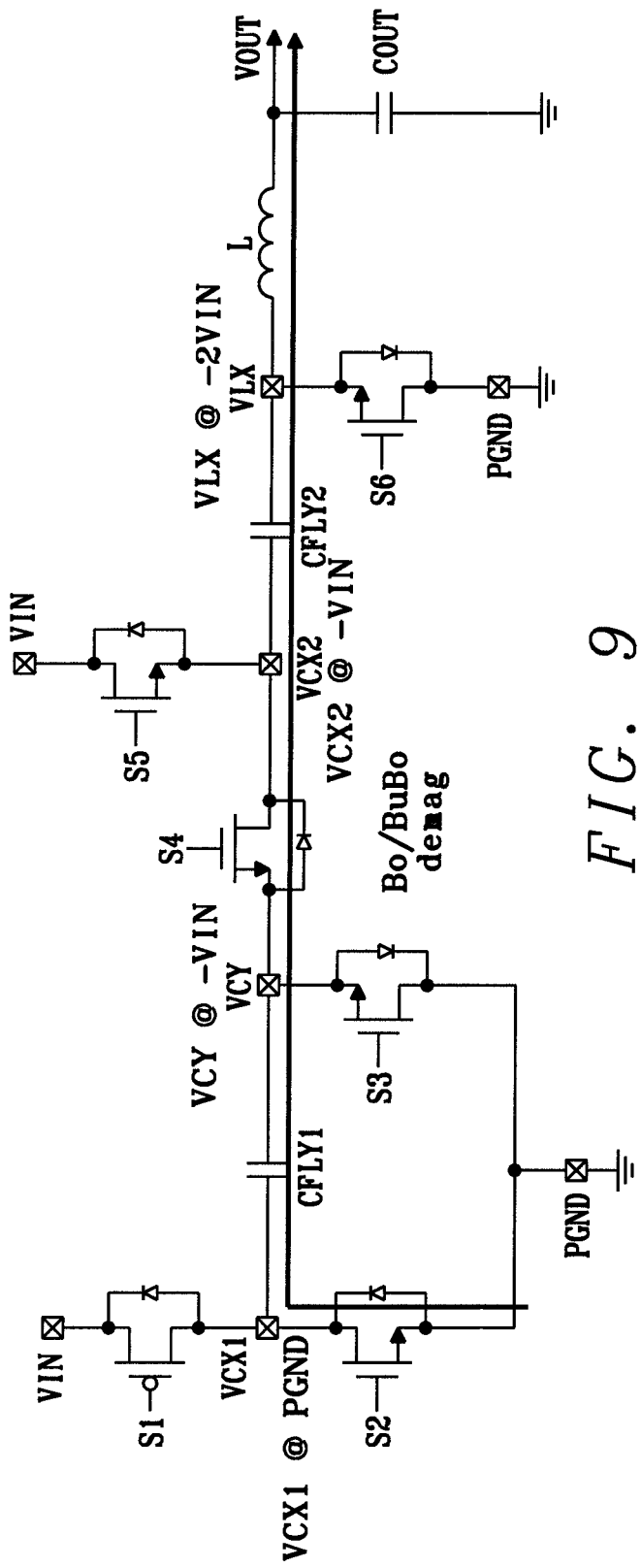
FIG. 9 shows a boost demagnetizing phase/buck-boost demagnetizing phase for the converter of FIG. 5.

The converter represented in FIG. 5 cycles through phases of FIGS. 7, 8, and 9. It is equivalent to a conventional buck DC-DC converter: the voltage swing at the LX node (PGND, -VIN or -2VIN) is filtered by a second order low pass filter (inductor L and output capacitor COUT). The output voltage VOUT is taken from the non-grounded terminal of the output capacitor COUT as done for converter in FIG. 1.

The converter of FIG. 5 operates in the following switching phases:
The buck operation cycles through magnetization phase shown in FIG. 7 and buck demagnetization phase in FIG. 8.

During the magnetization phase, both flying capacitors are recharged to $V_{IN}$ through switches S1, S3 and S5, S6. The switch S6 connects the VLX node to PGND. The inductor is magnetized with $V_{OUT}$/L current slope. During the demagnetization phase, the flying capacitor $C_{FLY1}$ is parked, i.e. connected between the input voltage $V_{IN}$ and PGND through switches S1 and S3. When parked, the capacitor voltage may be kept constant at $V_{IN}$. The second flying capacitor $C_{FLY2}$ is connected between PGND—using switches S3 and S4—and the VLX node. In this configuration, the voltage goes negative at VLX node. The inductor is demagnetized with $(-V_{IN}-V_{OUT})$/L current slope.

A first possible boost operation cycles through magnetization phase shown in FIG. 8 and demagnetization phase in FIG. 9. During the magnetization phase, the flying capacitor $C_{FLY1}$ is parked, i.e. connected between $V_{IN}$ and PGND through switches S1 and S3. The second flying capacitor $C_{FLY2}$ is connected between PGND—using switches S3 and S4—and the VLX node. In this configuration, the voltage goes negative at VLX node. The inductor is magnetized with $(-V_{IN}-V_{OUT})$/L current slope. During the boost demagnetization phase $C_{FLY1}$ and $C_{FLY2}$ are connected in series through switch S4. The node VCX1 is connected to PGND through switch S2, therefore the node VLX goes to $-2V_{IN}$.

We should observe that switches S5, S6 are both experiencing $V_{DS}=2V_{IN}$ voltage in this phase. The inductor is demagnetized with $(-2V_{IN}-V_{OUT})$/L current slope. The relationship between $V_{IN}$ and $V_{OUT}$ for this boost mode is expressed by $V_{OUT}/V_{IN}=-(2-D)$, with $D\in[0,1]$. In addition, we should also note that the first possible boost operation described above cannot be sustained for indefinite time as the flying capacitor $C_{FLY2}$ has to be recharged (through a buck magnetization phase).

A time-independent boost operation cycles through phases of FIG. 7—flying capacitors recharge—and FIG. 9—VLX node at $-2V_{IN}$. This configuration increases the voltage ripple across the coil with respect to the boost mode described before.

The relationship between $V_{IN}$ and $V_{OUT}$ for the time-independent boost mode is expressed by: $V_{OUT}/V_{IN}=-2(1-D)$, with $D\in[0,1]$.

The buck-boost operation cycles through phases of FIG. 7, FIG. 8, and FIG. 9. This operation may involve all switches.

The voltage rating (maximum $V_{DS}$ voltage $V_{DS\_max}$) for the FET devices of the converter in FIG. 5 is summarized in the table in FIG. 6. A higher voltage rating translates into a higher $R_{sp}$ for the device and, in turn, into a larger silicon area for a given target on-resistance $R_{ON}$ of a FET device.

Figure 10:
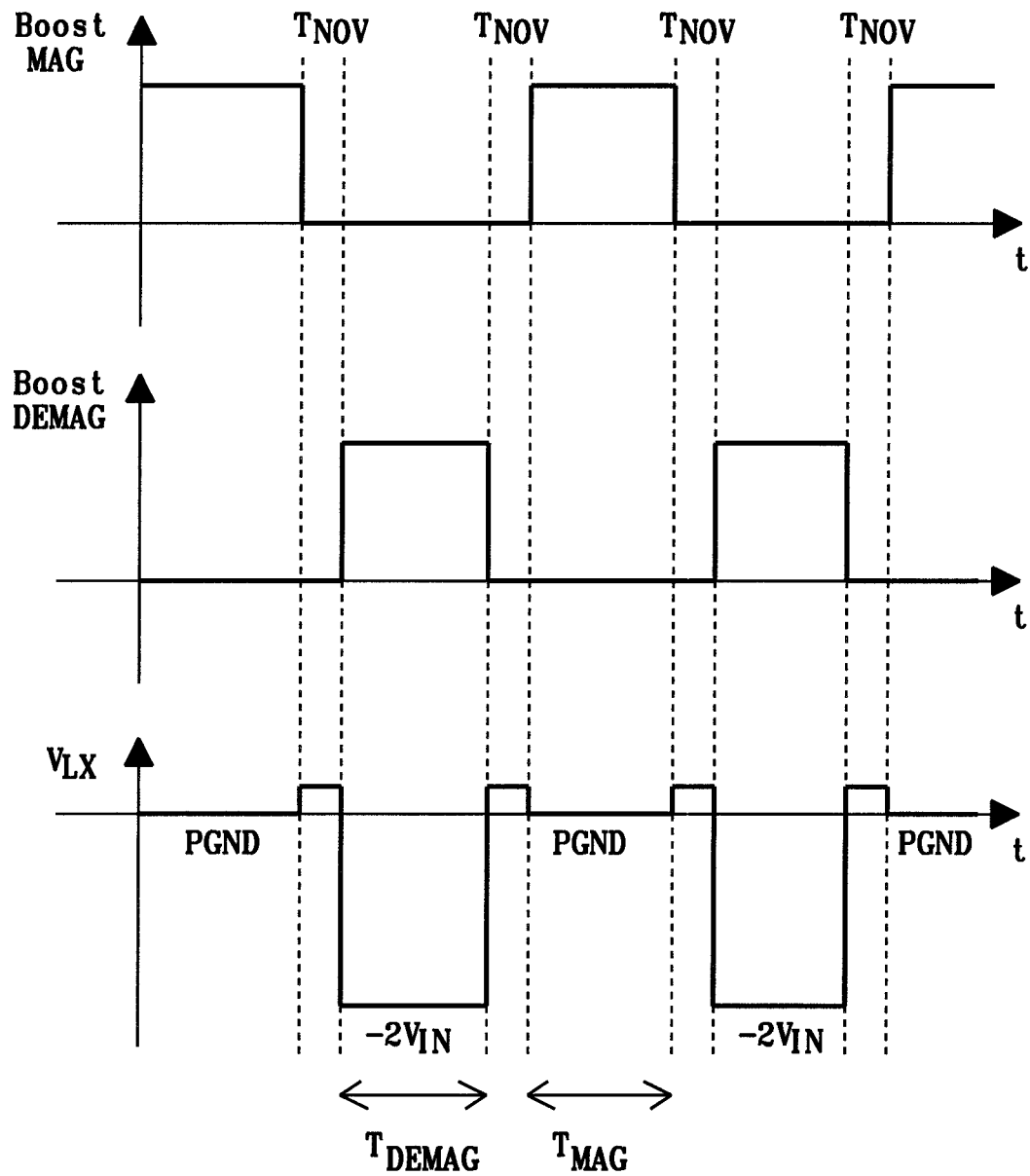
FIG. 10 shows a timing diagram of the converter of FIG. 5 when operating in boost mode.

The converter of FIG. 5 has a fundamental output voltage $V_{OUT}$ limitation during its boost operation—assuming the time-independent boost mode which cycles between phase in FIG. 7 and FIG. 9. The timing diagram of the converter during boost operation is shown in FIG. 10. The limitation is a consequence of the charge conservation on both flying capacitors $C_{F4}$: the charge removed from the capacitors during the boost demagnetizing phase (see FIG. 9) is added during the boost magnetizing phase (see FIG. 7). Therefore, the current $I_{FLY}$ flowing in $C_{FLY1}$ during the demagnetizing phase can be expressed as (by applying charge conservation principle): $I_{OUT}/I_{CFLY1}=D/(1-D)$, with $D\in[0,1]$. The latter equation indicates that in order to keep $I_{CFLY1}<I_{OUT}$, the duty cycle D should be limited to 0.5. For values of D>0.5, the current $I_{cy}$ experiences a steep increase. Similar considerations apply to the second flying capacitor CFLY2.

Figure 11:
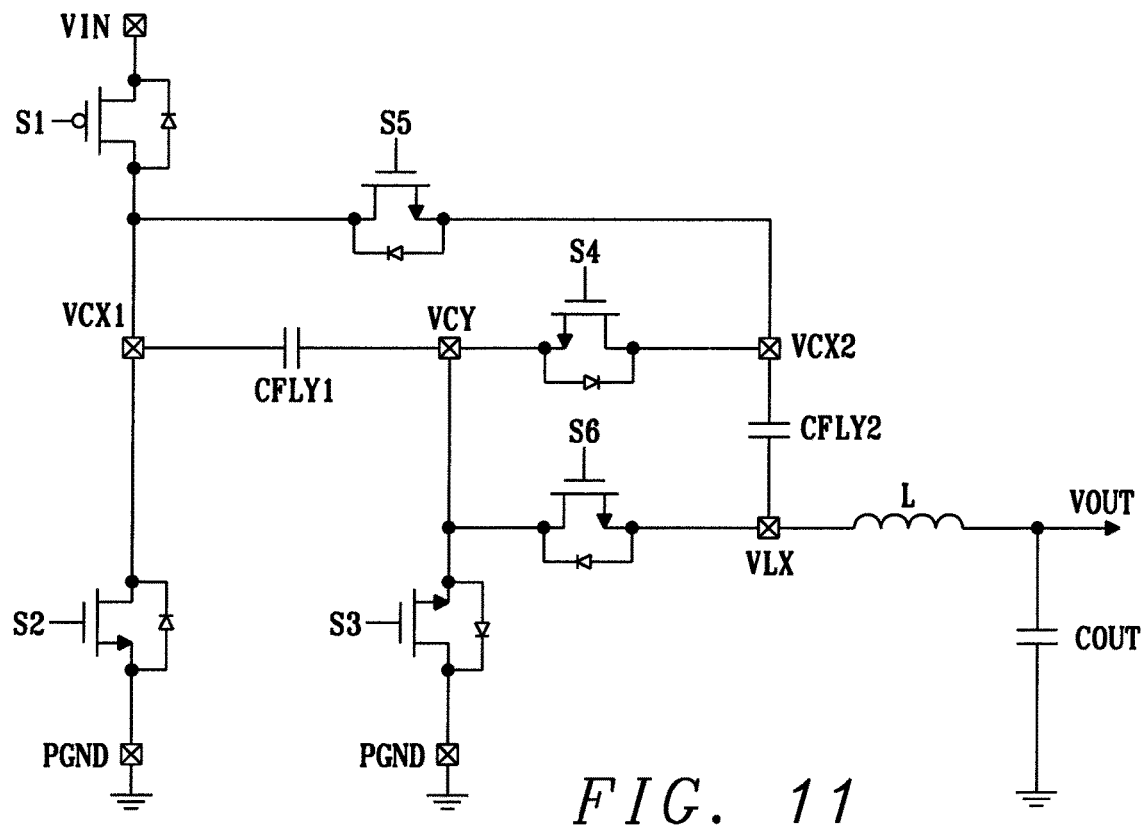
FIG. 11 shows an exemplary hybrid inverting buck-boost topology.

A further hybrid inverting converter is shown in FIG. 11. In this topology, the switch S5 connects the node VCX2 (also denoted as the third capacitor node) to the input node VIN through the switch S1. At this, switch S5 is arranged in between node VCX1 (also denoted as the first capacitor node) and node VCX2 (i.e. the third capacitor node). Moreover, switch S6 connects the VLX node (also denoted as the inductor node) to PGND through the switch S3. At this, switch S6 is arranged in between node VLX (i.e. the inductor node) and node VCY (also denoted as the second capacitor node). These connections allow low voltage rating FETs for both S5 and S6 as they are in parallel to one flying capacitor when turned-off during the converter operation. In other words, in FIG. 11, the VLX terminal and VCY terminal may be shorted during a buck magnetization phase, and the VCX1 terminal and VCX2 terminal may be shorted during a buck magnetization phase.

Figure 12:
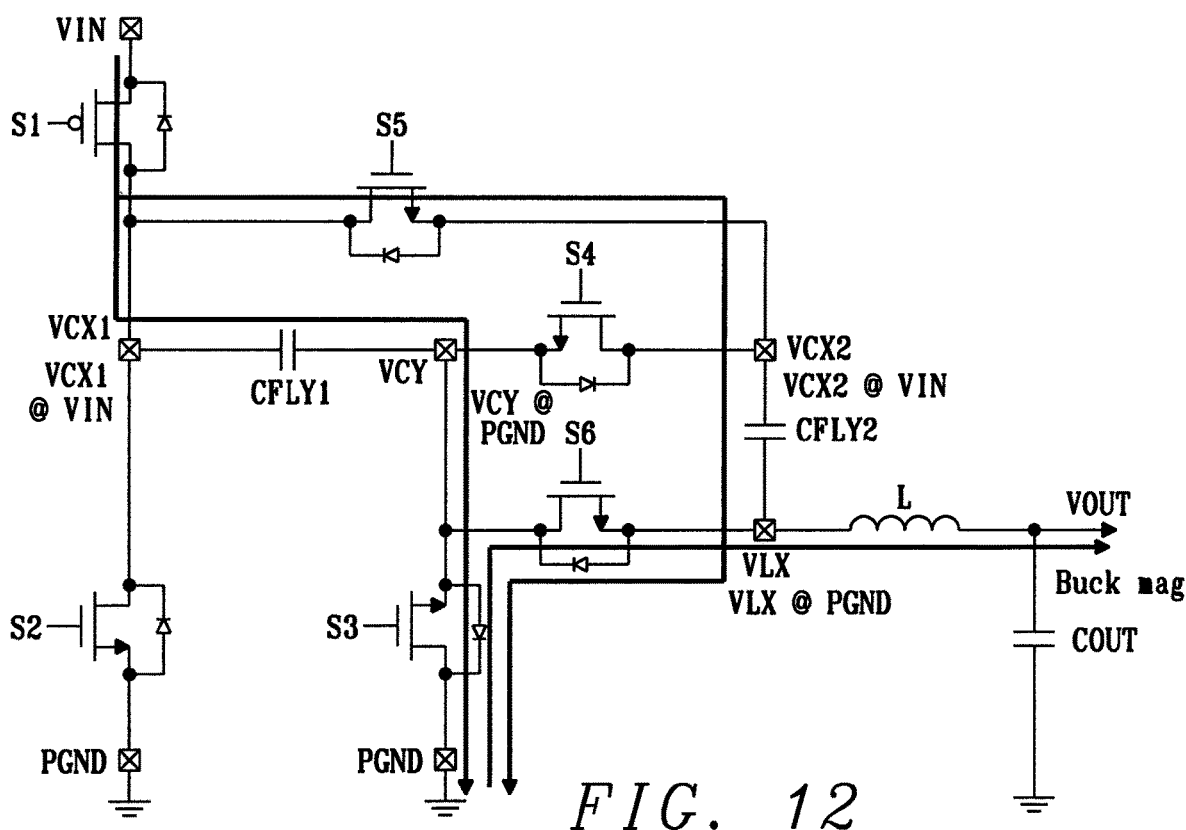
FIG. 12 shows a buck magnetizing phase of the converter of FIG. 11.
Figure 13:
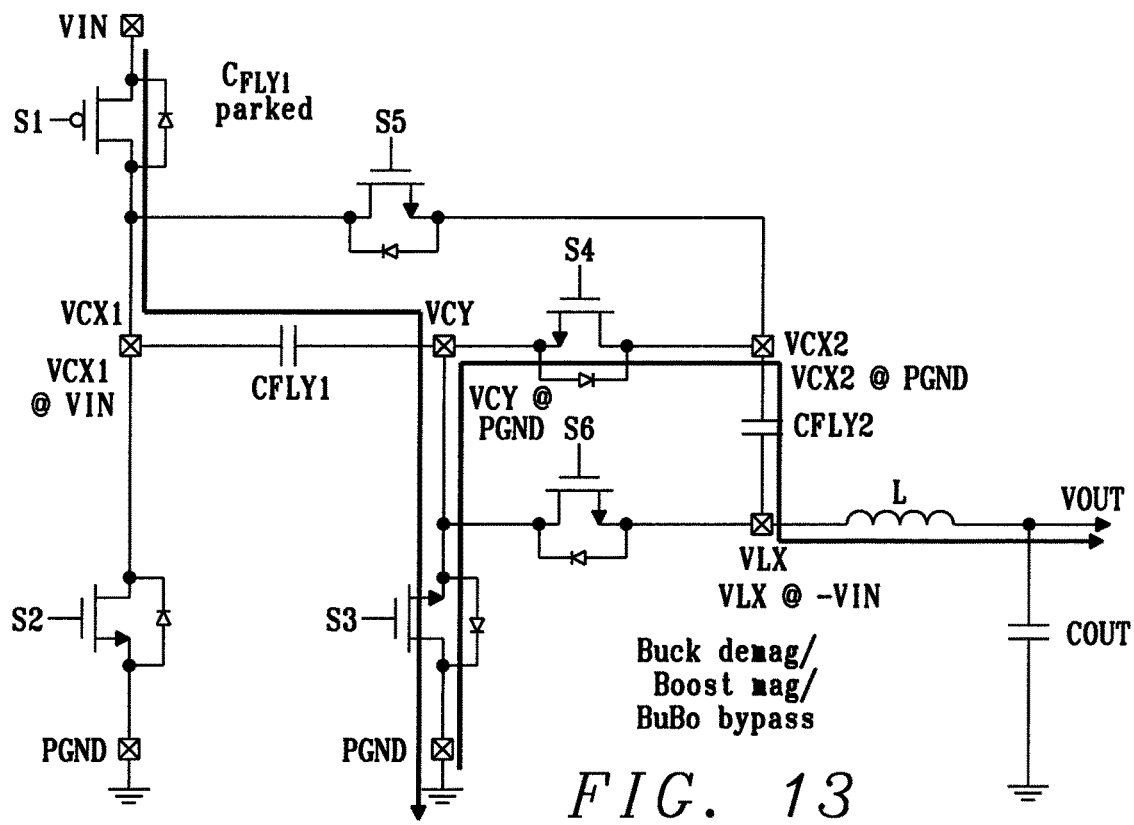
FIG. 13 shows a buck demagnetizing phase/boost magnetizing phase/buck-boost bypass phase for the converter of FIG. 11.
Figure 14:
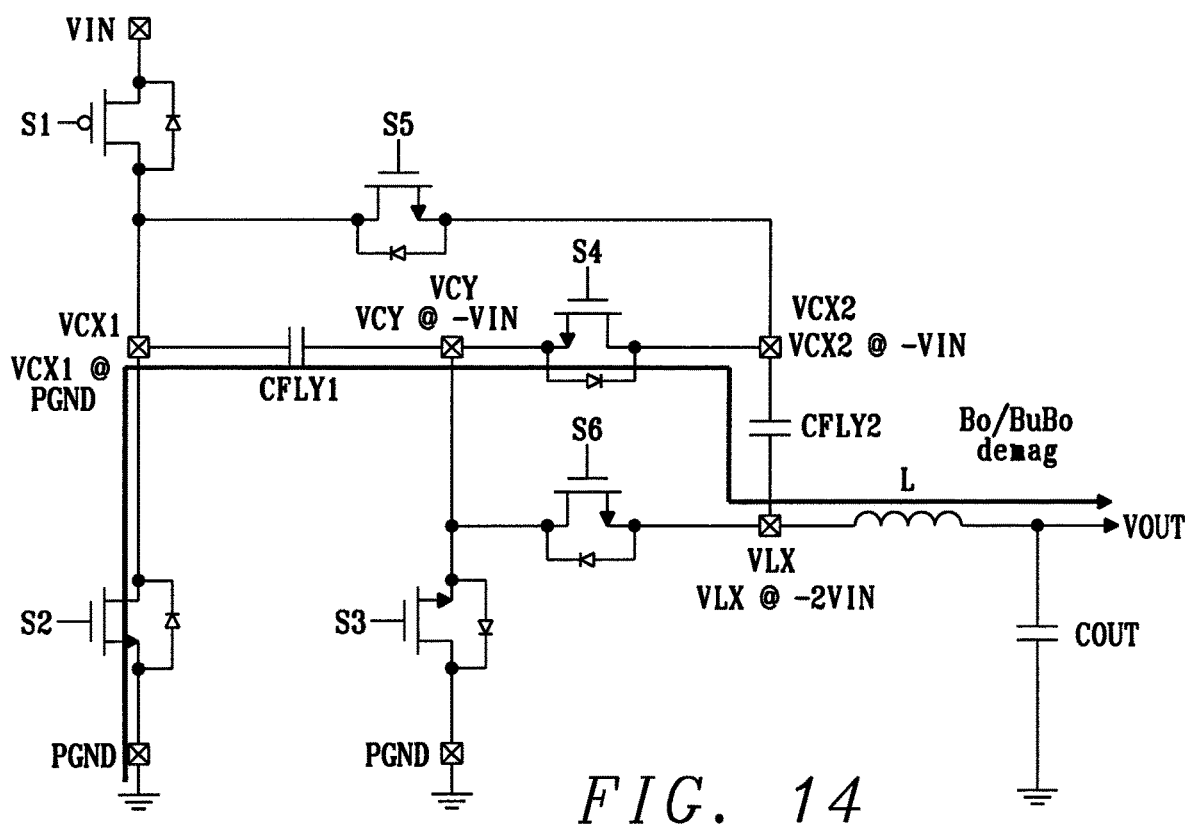
FIG. 14 shows a boost demagnetizing phase/buck-boost demagnetizing phase for the converter of FIG. 11.

FIG. 12, FIG. 13, and FIG. 14 show the switching phases of the hybrid inverting converter of FIG. 11. The operation of this topology is the similar to the operation of the converter in FIG. 5. However, it uses lower voltage rated devices for switches S5 and S6:

The buck operation cycles through phases of FIG. 12 and FIG. 13. It is equivalent to a conventional inverting buck involving only the second flying capacitor CFLY2. Switches S1, S5, S3, S6 are closed so that both flying capacitors CFLY are connected between VIN and PGND during the flying capacitor recharge.

A boost operation cycles through phases of FIG. 13 and FIG. 14. As described before, this operation cannot be sustained for indefinite time as the flying capacitor CFLY2 has to be recharged (e.g. through the buck magnetization phase illustrated in FIG. 12). A time-independent boost mode operation cycles through phases of FIG. 12 and FIG. 14. During boost operating mode, none of the instantiated switches is exposed to a drain-source voltage $V_{DS}>V_{IN}$.

The buck-boost operation cycles through phases of FIG. 12, FIG. 13, and FIG. 14, and may involve all switches.

Figure 15:
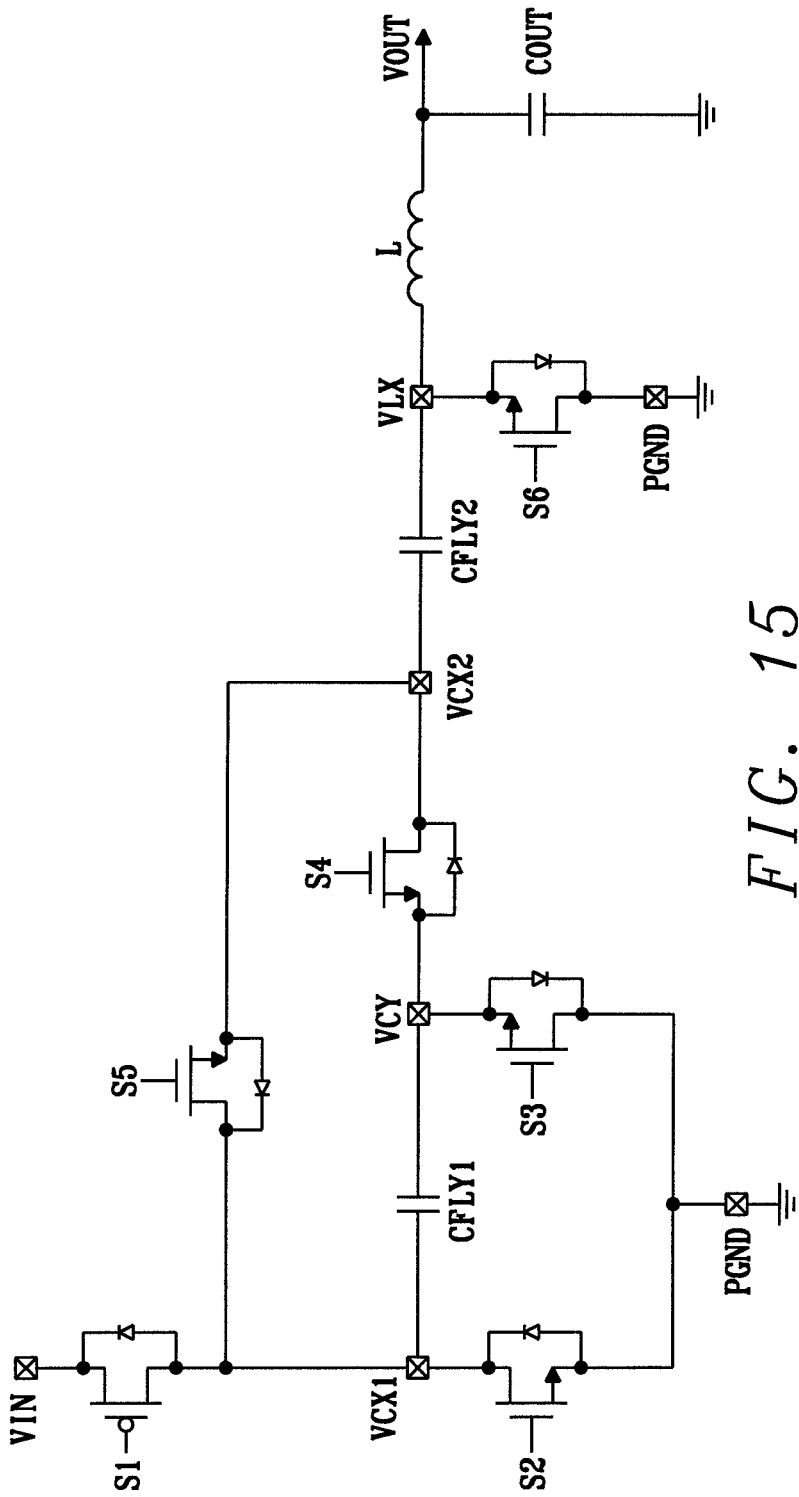
FIG. 15 shows an exemplary hybrid inverting buck-boost variant with low voltage rating for switch S5.
Figure 16:
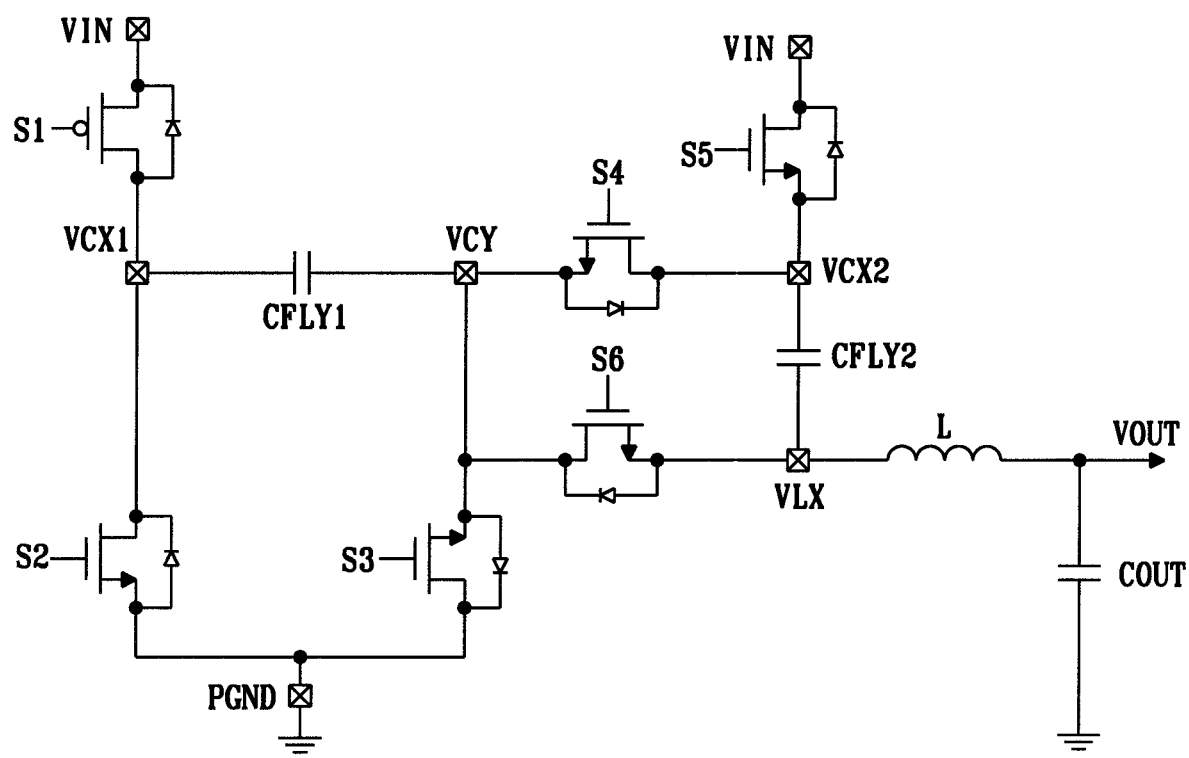
FIG. 16 shows an exemplary hybrid inverting buck-boost variant with low voltage rating for switch S6.

Two variants can be derived from the topology of FIG. 11: On the one hand, FIG. 15 shows a hybrid buck-boost variant with low voltage rating for switch S5. This switch operates in parallel to the first flying capacitor $C_{FLY1}$, therefore a reduced voltage rate is enabled. On the other hand, FIG. 16 shows a hybrid buck-boost variant with low voltage rating for switch S6. This switch operates in parallel to the second flying capacitor $C_{FLY2}$, therefore a reduced voltage rate is enabled.

Figure 17:
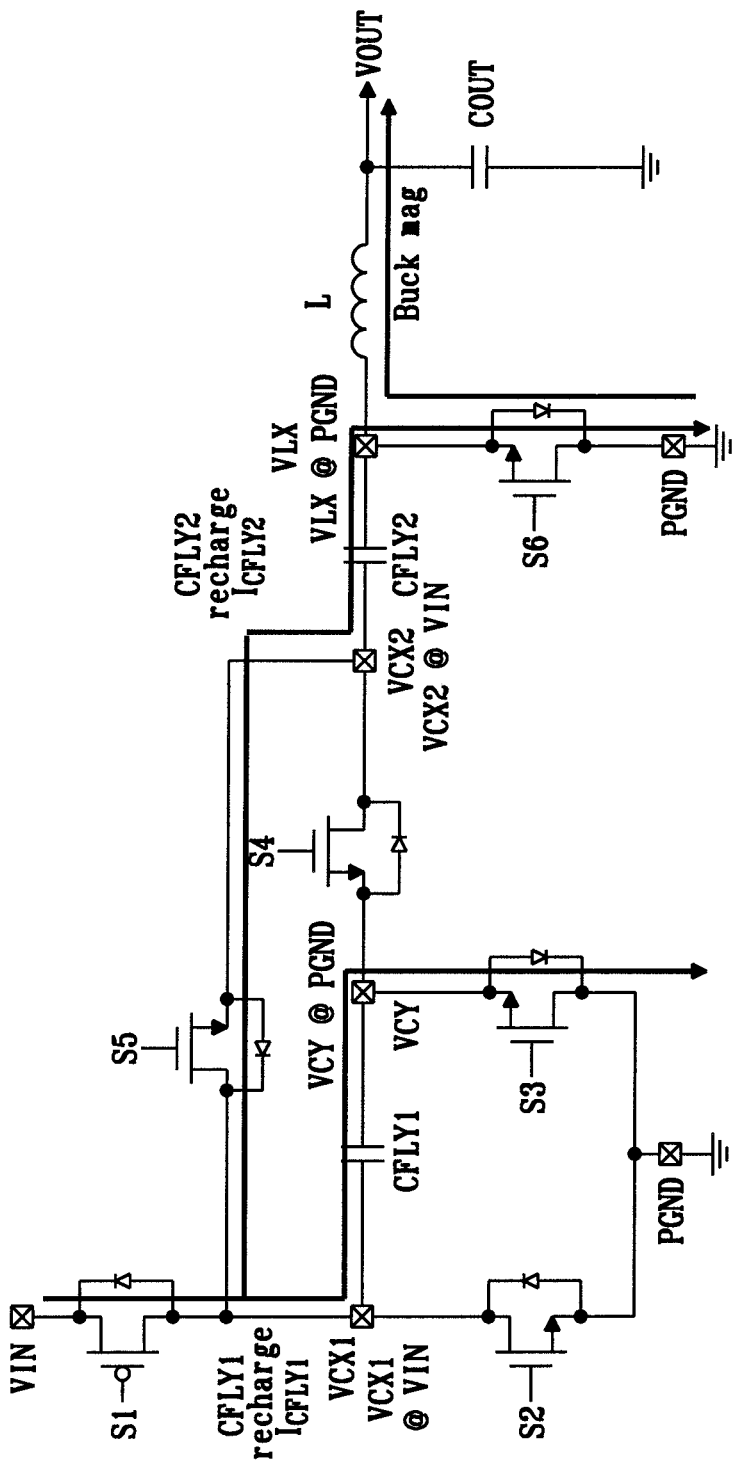
FIG. 17 shows a buck magnetizing phase of the converter of FIG. 15.
Figure 18:
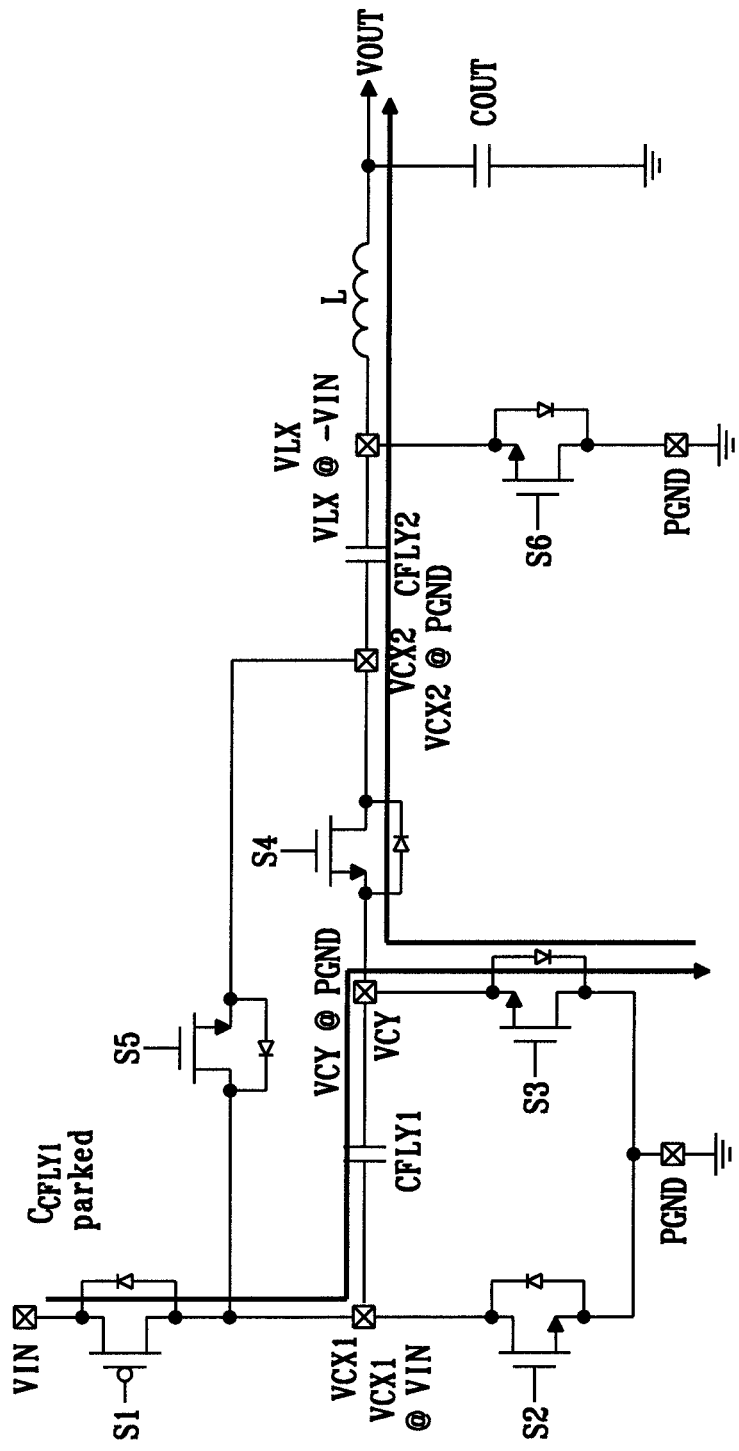
FIG. 18 shows a buck demagnetizing phase/boost magnetizing phase/buck-boost bypass phase for the converter of FIG. 15.
Figure 19:
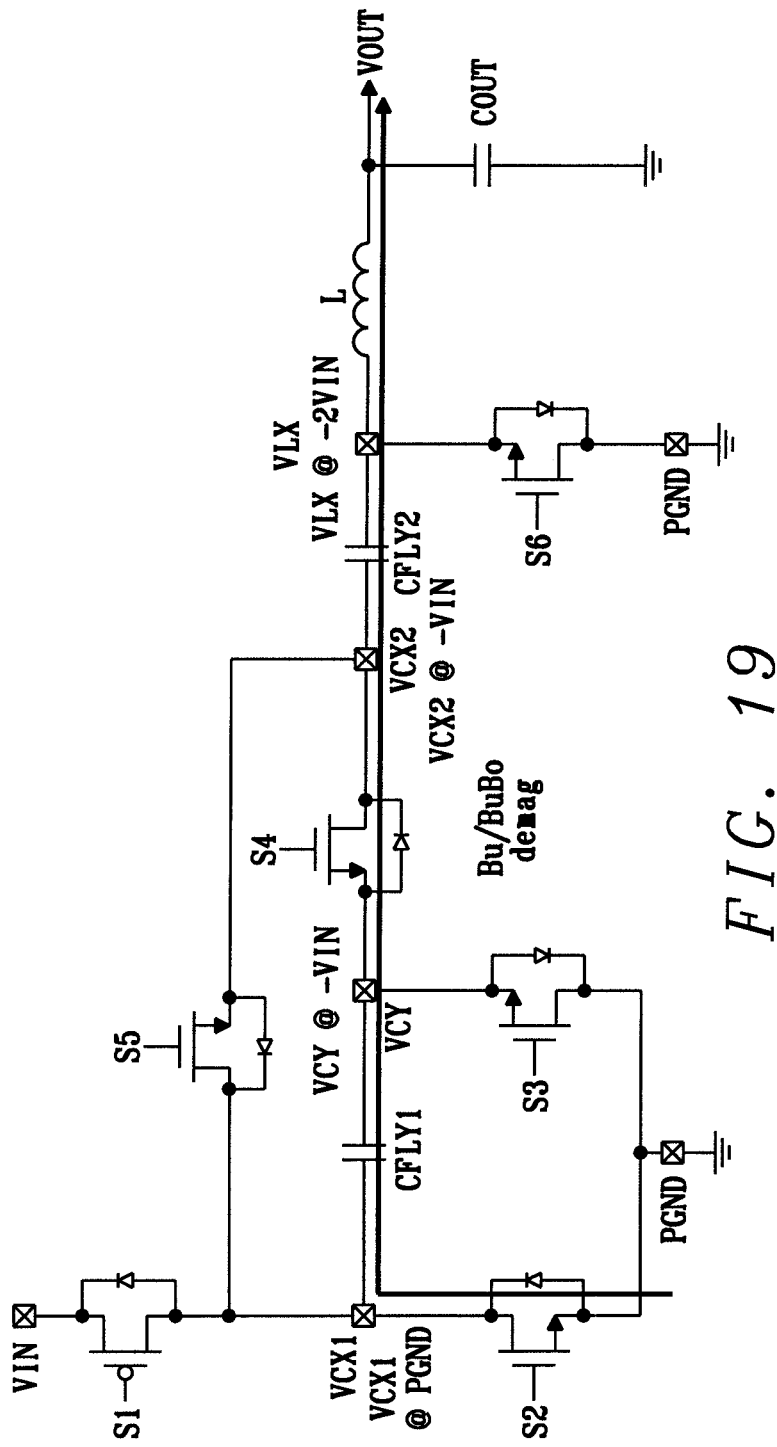
FIG. 19 shows a boost demagnetizing phase/buck-boost demagnetizing phase for the converter of FIG. 15.
Figure 20:
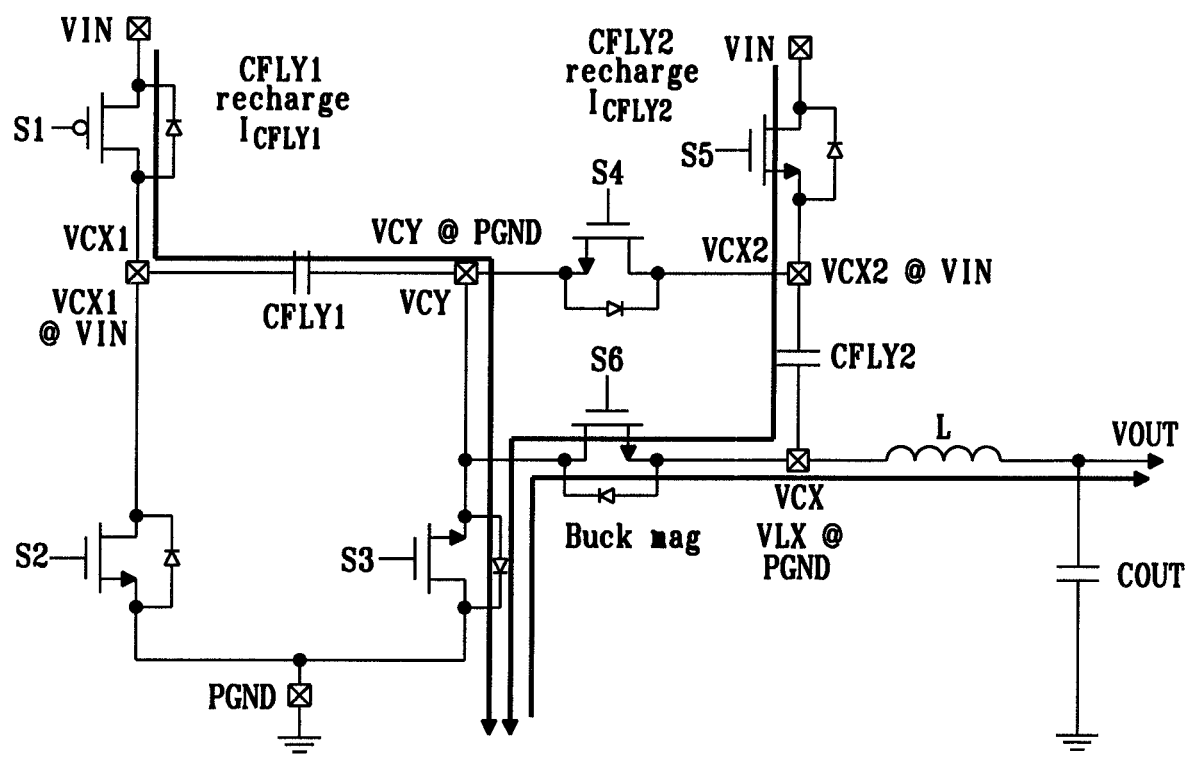
FIG. 20 shows a buck magnetizing phase of the converter of FIG. 16.
Figure 21:
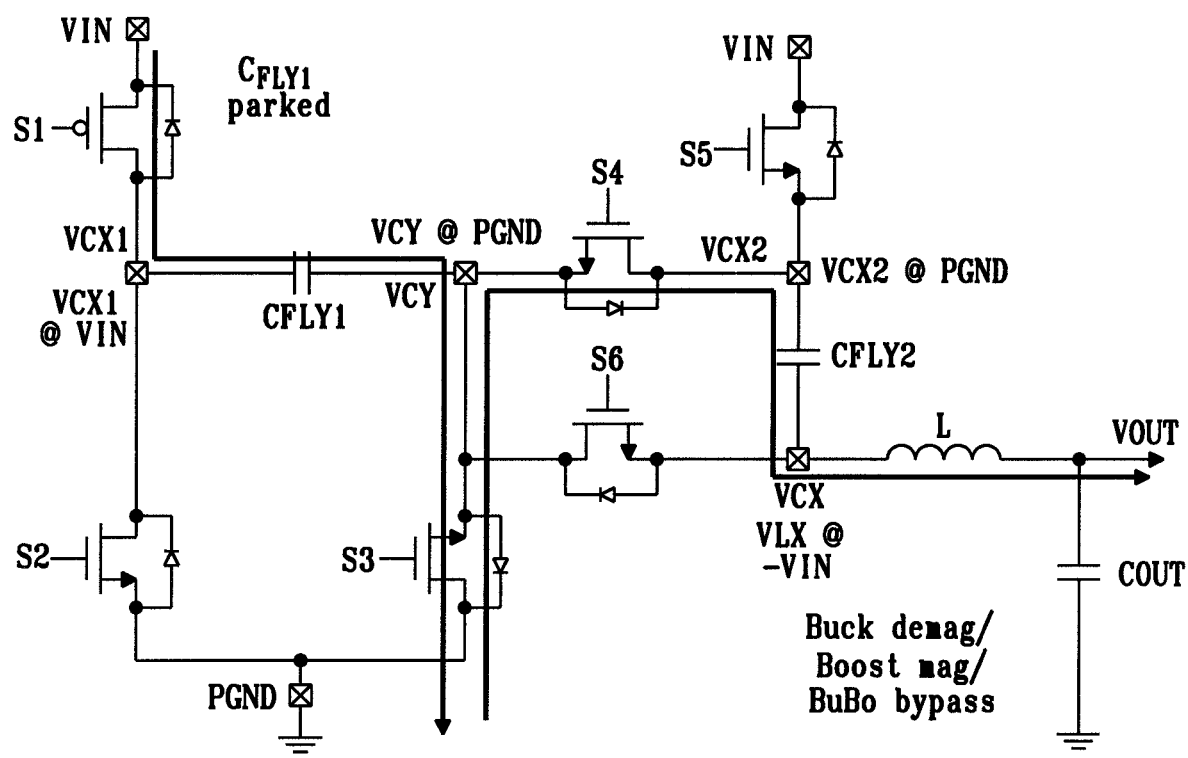
FIG. 21 shows buck demagnetizing phase/boost magnetizing phase/buck-boost bypass phase for the converter of FIG. 16.
Figure 22:
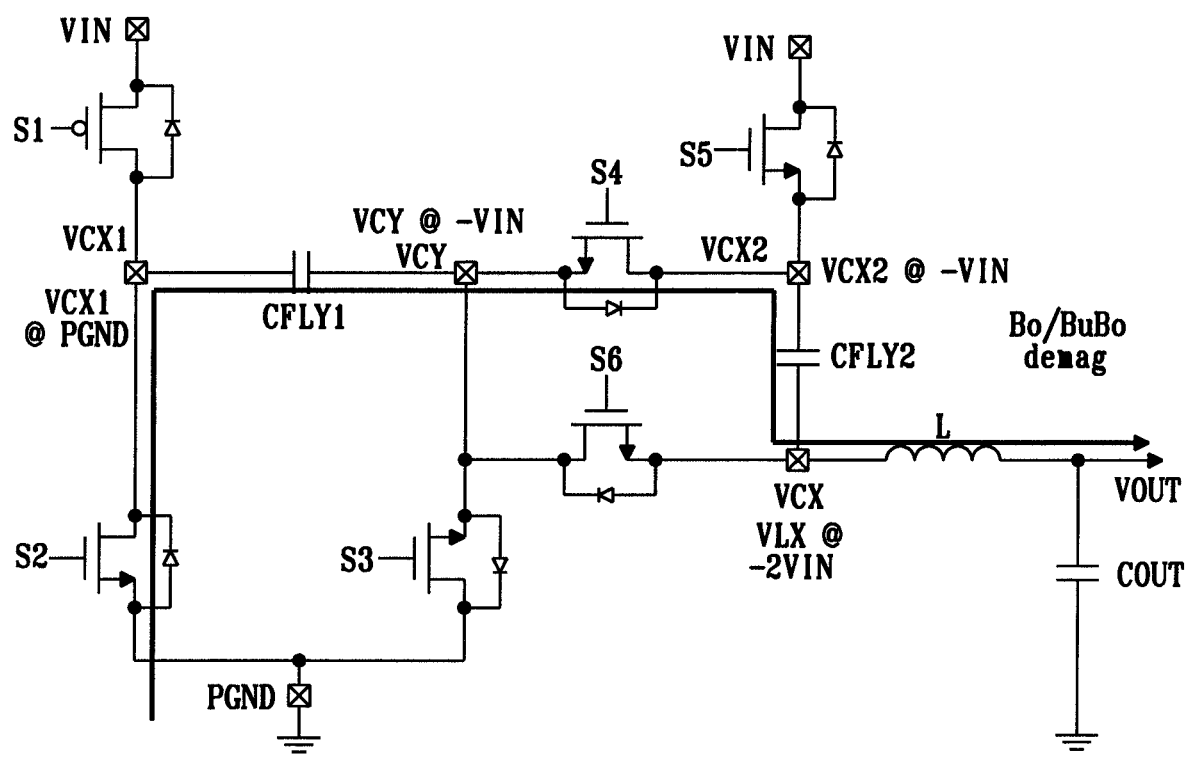
FIG. 22 shows a boost demagnetizing phase/buck-boost demagnetizing phase for the converter of FIG. 16.

The above-described hybrid buck-boost variants exploit the operating phases described before for the architecture of FIG. 11. FIG. 17 to FIG. 22 depict the corresponding switching phases. Specifically, FIG. 17 shows a buck magnetizing phase (also denoted as first phase of operation) of the converter of FIG. 15. FIG. 18 shows a buck demagnetizing phase/boost magnetizing phase/buck-boost bypass phase (also denoted as second phase of operation) for the converter of FIG. 15. FIG. 19 shows a boost demagnetizing phase/buck-boost demagnetizing phase (also denoted as third phase of operation) for the converter of FIG. 15. FIG. 20 shows a buck magnetizing phase (also denoted as first phase of operation) of the converter of FIG. 16. FIG. 21 shows buck demagnetizing phase/boost magnetizing phase/buck-boost bypass phase (also denoted as second phase of operation) for the converter of FIG. 16. FIG. 22 shows a boost demagnetizing phase/buck-boost demagnetizing phase (also denoted as third phase of operation) for the converter of FIG. 16.

The voltage ratings for the devices of these hybrid converter topologies are reported in the table in FIG. 23. In particular, FIG. 23 compares the voltage rating for the topology of FIG. 11 (new hybrid), the topology of FIG. 15 (variant LV S5), and the topology of FIG. 16 (variant LV S6). Because of the reduced $V_{DS\_max}$ for the switches, devices with lower $R_{SP}$ can be used to lower silicon area while achieving higher $V_{OUT}$ for a given $I_{OUT}$ and $V_{IN}$ or lower $V_{IN}$ for a given $V_{OUT}$ and $I_{OUT}$.

The hybrid buck-boost architectures of FIG. 11 and its variants of FIG. 15 and FIG. 16 have the same trade-off explained for the architecture of FIG. 5 between $V_{OUT\_max}$ and $I_{OUT}$ because of the charge conservation on both flying capacitors $C_{FLY}$. However, the use of devices rated for lower $V_{DS}$ voltage allows to reduce the IR drop developed on switches S5 and S6 while occupying less area on silicon. The presented hybrid topology and its variant can also be used either at input or at output pin of a DC-DC converter in order to double the input voltage or the output voltage, respectively.

In conclusion, for the same target impedance of the power FETs, the topologies of this invention occupy lower area while achieving higher $V_{OUT}$ for a given load current. Alternatively, lower $V_{IN}$ voltages could be achieved for the same $V_{OUT}$ voltages and load current $I_{OUT}$.

An additional advantage of the proposed invention with respect to traditional inverting buck-boost architectures is the fast response and low noise output voltage. The presented topologies require a coil connected between LX node and the output node, like a buck converter. It allows delivering current to the output during both coil magnetizing and demagnetizing phases, i.e. no Right Half-Plane Zero (RHPZ) impacts the frequency response of the presented architectures.

Moreover, the LC filter at the output of the converter dramatically reduces the high frequency noise that would otherwise be generated by discontinues current delivery to the output.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to receive an input voltage at an input node of the power converter and to generate an output voltage at an output node of the power converter, the power converter comprising:

an inductor coupled between an inductor node and the output node, a first flying capacitor coupled between a first capacitor node and a second capacitor node, a second flying capacitor coupled between a third capacitor node and the inductor node, a first switching element coupled between the input node and the first capacitor node, and a fifth switching element coupled between the first capacitor node and the third capacitor node, wherein the power converter is configured to:

charge the second flying capacitor by establishing a current path from the input node, via the first switching element, via the fifth switching element, and via the second flying capacitor to a reference potential; and/or discharge the first flying capacitor and the second flying capacitor by turning off the fifth switching element and by establishing a current path from a reference potential, via the first flying capacitor, via the second flying capacitor, and via the inductor to the output node of the power converter.

2. The power converter according to claim 1, further comprising a second switching element coupled between the first capacitor node and a reference potential.

3. The power converter according to claim 1, further comprising a third switching element coupled between the second capacitor node and a reference potential.

4. The power converter according to claim 1, further comprising a fourth switching element coupled between the second capacitor node and the third capacitor node.

5. The power converter according to claim 1, further comprising a sixth switching element coupled between the inductor node and a reference potential.

6. The power converter according to claim 1, further comprising a sixth switching element coupled between the inductor node and the second capacitor node.

7. The power converter according to claim 1, wherein the power converter is configured to establish, during a first phase of operation, a first current path from the input node, via the first switching element, and via the first flying capacitor to a reference potential.

8. The power converter according to claim 7, wherein the power converter is configured to establish, during the first phase of operation, a second current path from the input node, via the first switching element, via the fifth switching element, and via the second flying capacitor to the reference potential.

9. The power converter according to claim 7, wherein the power converter is configured to establish, during the first phase of operation, a third current path from the reference potential via the inductor to the output node of the power converter.

10. The power converter according to claim 1, wherein the power converter is configured to establish, during a second phase of operation, a first current path from the input node, via the first switching element, and via the first flying capacitor to a reference potential.

11. The power converter according to claim 10, wherein the power converter is configured to establish, during the second phase of operation, a second current path from the reference potential, via the second flying capacitor, and via the inductor to the output node of the power converter.

12. The power converter according to claim 1, wherein the power converter is configured to establish, during a third phase of operation, a current path from a reference potential, via the first flying capacitor, via the second flying capacitor, and via the inductor to the output node of the power converter.

13. A power converter configured to receive an input voltage at an input node of the power converter and to generate an output voltage at an output node of the power converter, the power converter comprising:

an inductor coupled between an inductor node and the output node, a first flying capacitor coupled between a first capacitor node and a second capacitor node, a second flying capacitor coupled between a third capacitor node and the inductor node, a first switching element coupled between the input node and the first capacitor node, and a sixth switching element coupled between the second capacitor node and the inductor node, wherein the power converter is configured to:

charge the second flying capacitor by establishing a current path from the input node via the second flying capacitor, and via the sixth switching element to a reference potential; and/or discharge the first flying capacitor and the second flying capacitor by turning off the sixth switching element and by establishing a current path from a reference potential, via the first flying capacitor, via the second flying capacitor, and via the inductor to the output node of the power converter.

14. The power converter according to claim 13, further comprising a second switching element coupled between the first capacitor node and a reference potential.

15. The power converter according to claim 13, further comprising a third switching element coupled between the second capacitor node and a reference potential.

16. The power converter according to claim 13, further comprising a fourth switching element coupled between the second capacitor node and the third capacitor node.

17. The power converter according to claim 13, further comprising a fifth switching element coupled between the third capacitor node and the input node of the power converter.

18. The power converter according to claim 13, further comprising a fifth switching element coupled between the third capacitor node and the first capacitor node.

19. The power converter according to claim 13, wherein the power converter is configured to establish, during a first phase of operation, a first current path from the input node, via the first switching element, and via the first flying capacitor to a reference potential.

20. The power converter according to claim 19, wherein the power converter is configured to establish, during the first phase of operation, a second current path from the input node, via the second flying capacitor, and via the sixth switching element to the reference potential.

21. The power converter according to claim 19, wherein the power converter is configured to establish, during the first phase of operation, a third current path from the reference potential, via the sixth switching element, and via the inductor to the output node of the power converter.

22. The power converter according to claim 13, wherein the power converter is configured to establish, during a second phase of operation, a first current path from the input node via the first flying capacitor to a reference potential.

23. The power converter according to claim 22, wherein the power converter is configured to establish, during the second phase of operation, a second current path from the reference potential, via the second flying capacitor, and via the inductor to the output node of the power converter.

24. The power converter according to claim 13, wherein the power converter is configured to establish, during a third phase of operation, a current path from a reference potential, via the first flying capacitor, via the second flying capacitor, and via the inductor to the output node of the power converter.

25. A method of operating a power converter, the power converter comprising an inductor coupled between an inductor node and an output node of the power converter, a first flying capacitor coupled between a first capacitor node and a second capacitor node, a second flying capacitor coupled between a third capacitor node and the inductor node, a first switching element coupled between the input node and the first capacitor node, and a fifth switching element coupled between the first capacitor node and the third capacitor node, the method comprising:
  charging the second flying capacitor by establishing a charging current from the input node, via the first switching element, via the fifth switching element, and via the second flying capacitor to a reference potential, and/or
  discharging the second flying capacitor by establishing a discharging current when said switching element is turned off, wherein the discharging current is established from a reference potential, via the first flying capacitor, via the second flying capacitor, and via the inductor to the output node of the power converter.

26. A method of operating a power converter, the power converter comprising an inductor coupled between an inductor node and an output node of the power converter, a first flying capacitor coupled between a first capacitor node and a second capacitor node, a second flying capacitor coupled between a third capacitor node and the inductor node, a first switching element coupled between the input node and the first capacitor node, and a sixth switching element coupled between the second capacitor node and the inductor node, the method comprising:
  charging the second flying capacitor by establishing a charging current from the input node, via the second flying capacitor, and via the sixth switching element to a reference potential, and/or
  discharging the second flying capacitor by establishing a discharging current when the sixth switching element is turned off, wherein the discharging current is established from a reference potential, via the first flying capacitor, via the second flying capacitor, and via the inductor to the output node of the power converter.

* * * * *